(No Model.)

E. H. JOHNSON.
CONNECTION FOR ELECTRICAL CONDUCTORS.

No. 311,130. Patented Jan. 20, 1885.

ATTEST:
E. C. Rowland
H. W. Seely

INVENTOR:
Edward H. Johnson
By Rich'd N. Dyer
Atty.

UNITED STATES PATENT OFFICE.

EDWARD H. JOHNSON, OF NEW YORK, N. Y., ASSIGNOR TO BERGMANN & CO., OF SAME PLACE.

CONNECTION FOR ELECTRICAL CONDUCTORS.

SPECIFICATION forming part of Letters Patent No. 311,130, dated January 20, 1885.

Application filed January 10, 1884. (No model.)

*To all whom it may concern:*

Be it known that I, EDWARD H. JOHNSON, of New York city, in the county and State of New York, have invented a certain new and useful Improvement in Connections for Electrical Conductors, of which the following is a specification.

This invention relates to means for joining together the wires of electrical circuits, and especially to the main conductors of systems of electrical distribution when such conductors are placed on poles overhead, the object being to make good electrical and mechanical connections between the ends of two wires forming parts of the same conductor, or between a main wire and a wire of a branch circuit, and also to conveniently place a safety-catch in the line of one of such main conductors, all such connections being made without any soldering or welding of joints; and my invention consists, mainly, in the connecting of two metallic parts of a circuit together by forcing a screw between them, such parts being held from lateral movement away from the screw, whereby the screw cuts into both parts and unites them firmly; and the invention consists, further, in the other novel features of invention employed in carrying out the objects specified, as hereinafter set forth.

Figure 1:
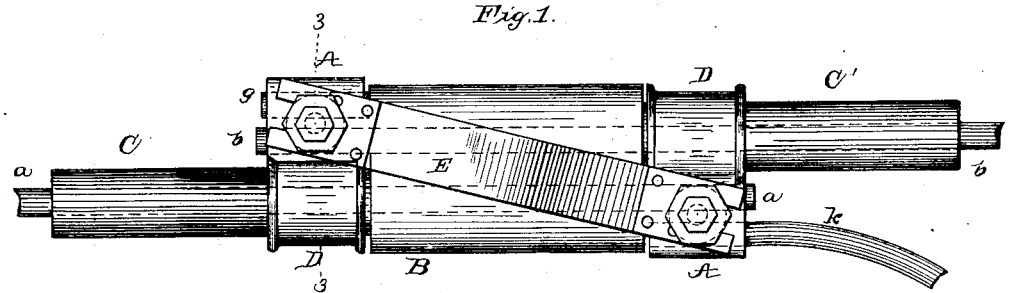
Figure 2:
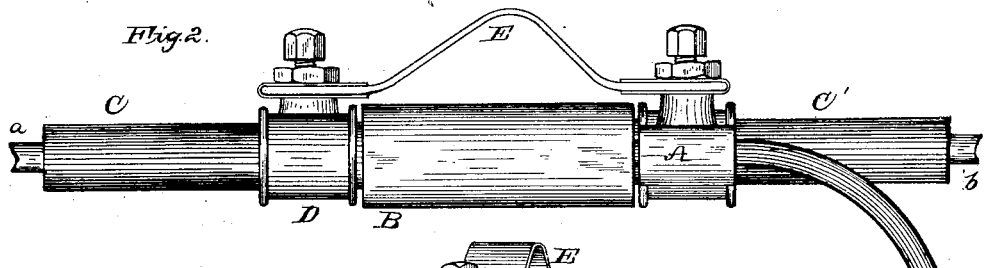
Figure 3:
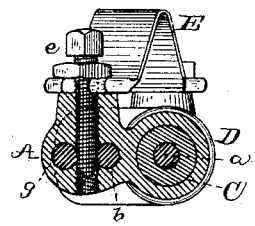
Figure 4:
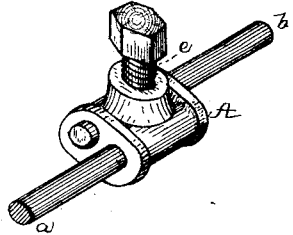
Figure 5:
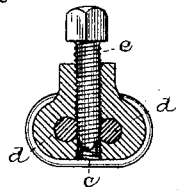
Figure 6:

In the accompanying drawings, Figure 1 is a plan view of a device embodying my invention, joining two parts of a main conductor and the end of a branch conductor, and interpolating a safety-catch in such main conductor; Fig. 2, a side view of the same; Fig. 3, a cross-section of the wire-connecting devices on line 3 3; Fig. 4, a perspective view of the simplest form of my invention used for connecting the ends of two parts of a conductor; Fig. 5, a section of the same, and Fig. 6 an enlarged view of the end of the connecting-screw.

Referring, first, to Figs. 4 and 5, A is a metallic receptacle. The two conductors $a$ and $b$ enter this receptacle, through the center of which extends a screw-threaded aperture, $c$. The conductors pass through longitudinal apertures $d$ $d$, which, within the receptacle, join the central aperture. Then, to connect the wires together, the screw is screwed into the aperture $c$. This screw is of hard metal, and has a smooth blunt tapering end, $f$, which is forced between the wires, and they being held from lateral movement the screw-thread cuts into the copper on both sides, making good and firm connection with and between the two conductors. I prefer to make the screw $e$ of phosphor-bronze, to prevent local electrical action. This connection is a very simple one for merely joining the two parts of a main conductor, as all that is necessary is to insert the two ends and force in the screw with a suitable wrench, or otherwise. In Figs. 1, 2, and 3, however, the placing of a fusible safety-catch in the main conductor and the connection of a branch wire are illustrated. I here employ an insulating-block, B, preferably of wood, from the ends, and on opposite sides of which extend the two tubular wooden extensions C C', the apertures in which extend entirely through the block B. The ends of the main conductors $a$ and $b$ which are to be connected are placed in such apertures. Two receptacles, A, are used, and cast in one piece with each is the metallic sleeve D, which sleeves are placed upon the projecting wooden parts C C', so that each conductor extending through the block B enters an aperture, $d$, of one of the receptacles. In the other aperture $d$ of each receptacle I may insert a short piece of wire, $g$, similar to the conductors $a$ $b$, as shown at the left-hand side of Fig. 1. The screw $e$ is then inserted between the conductor $a$ and the dead wire $g$. One end of the lead strip E, which forms a safety-catch, is placed under the head of screw $e$, it having a slot, $h$, through which the screw passes. The other end of the safety-catch is secured likewise under the head of the other screw $e$ at the opposite end of block B. At this end, if it were not desired to connect a branch wire with the main conductor, a short section of wire, like $g$, would be used; but in the present case the wire $k$ of a branch circuit is inserted in the receptacle A with the main wire $a$, and the screw $e$ is forced between $a$ and $k$, uniting them in the manner already described.

Instead of employing the dead wire $g$, the receptacle might be cast with only one longitudinal aperture, in which the main wire would be placed, and with an opposing projection, between which and the wire the screw would be forced.

The circuit in Figs. 1 and 2 is as follows: Conductor b, dead wire g, and screw e, safety-catch E, opposite screw e, to conductor a, and branch conductor k. The wooden tubes C C', extending some distance out upon the wires, prevent leakage between the receptacles A and said wires. The safety-catch link is supported with no strain upon it, and the conductor itself has so much of its length within the block as to distribute the weight of the block and connecting devices, and so reduce the strain upon the conductor.

I do not claim the invention of a conical-pointed screw for forcing the wires against the walls of an inclosing-body.

What I claim is—

1. In a device for joining the parts of an electric circuit, the combination of means for keeping such parts from lateral movement, and a screw forced between such parts and cutting into the same, substantially as set forth.

2. In a device for joining the ends of conductors, the combination of a receptacle for the ends, preventing lateral movement of the conductors, and a screw forced between and cutting into said conductors, substantially as set forth.

3. The combination of the metallic receptacle having two longitudinal apertures, and a central aperture connecting with both said longitudinal apertures, with the screw entering such central aperture, substantially as and for the purpose set forth.

4. The combination of the insulating-block, the metallic receptacles—one at each end of said block—for holding the ends of conductors, and the safety-catch connecting said receptacles, substantially as set forth.

5. The combination of the insulating-block provided with apertures through which the conductors to be joined pass, the metallic receptacles at the ends of the block, which the ends of such conductors enter, and the safety-catch connecting such receptacles, substantially as set forth.

6. The insulating-block having a tubular extension at each end, in combination with the receptacles supported by said extensions, the conductors passing through said block and its extensions and entering said receptacles, and the safety-catch connecting said receptacles, substantially as set forth.

7. The combination of the insulating-block, a receptacle supported at one end of said block, a main conductor passing through said block to said receptacle, the short section of conductor also in said receptacle, and the screw forced between said main conductor and said short section, substantially as set forth.

8. The combination of the receptacle and the sleeve placed on the extensions of the insulating-block to support such receptacle, substantially as set forth.

9. The combination of the receptacle and the supporting-sleeve with the insulating extension projecting beyond such sleeve, substantially as set forth.

10. The combination of the insulating-block, the receptacles at the ends thereof, the conductors to be joined, the connecting-screws, and the safety-catch having its ends held under the heads of said screws, substantially as set forth.

This specification signed and witnessed this 8th day of November, 1883.

EDWARD H. JOHNSON.

Witnesses:
H. W. SEELY,
EDWARD H. PYATT.

---

Correction in Letters Patent No. 311,130.

It is hereby certified that in Letters Patent No. 311,130, granted January 20, 1885, upon the application of Edward H. Johnson, of New York, New York, for an improvement in "Connections for Electrical Conductors," an error appears requiring the following correction, viz: The grant should read that the said patent was assigned to *Bergmann and Company, its successors or assigns*, instead of "Bergmann & Co., their heirs or assigns;" and that the grant should be read with this correction therein to make it conform to the records pertaining to the case in the Patent Office.

Signed, countersigned, and sealed this 27th day of January, A. D. 1885.

[SEAL.]

M. L. JOSLYN,
*Acting Secretary of the Interior.*

Countersigned:
BENJ. BUTTERWORTH,
*Commissioner of Patents.*